(12) United States Patent
Gaddy et al.

(10) Patent No.: US 6,845,243 B1
(45) Date of Patent: Jan. 18, 2005

(54) METHOD AND SYSTEM FOR ASSESSING THE SUSCEPTIBILITY OF A WIRELESS COMMUNICATION CHANNEL TO WIND-INDUCED FADING

(76) Inventors: Aubrey L. Gaddy, 12511 234th St. SE., Snohomish, WA (US) 98296; David G. Michelson, 1465 McNair Drive, North Vancouver, B.C. (CA), V7K 1X4; Douglas Frank Stolarz, 94 Wharfside Manor, Monmouth Beach, NJ (US) 07750

(*) Notice: Subject to any disclaimer, the term of this patent is extended or adjusted under 35 U.S.C. 154(b) by 0 days.

(21) Appl. No.: 09/535,365

(22) Filed: Mar. 24, 2000

(51) Int. Cl.[7] .............................................. H04B 7/005
(52) U.S. Cl. .................... 455/504; 455/67.16; 455/446; 342/361
(58) Field of Search .............................. 455/505, 227.1, 455/135, 436, 446, 430, 67.16, 501, 504, 506, 10, 63.1, 67.13, 65, 278.1; 342/361, 362, 363, 364, 365, 366; 340/436

(56) References Cited

U.S. PATENT DOCUMENTS

| | | | | |
|---|---|---|---|---|
| 5,257,405 A | * | 10/1993 | Reitberger | 455/514 |
| 5,634,206 A | * | 5/1997 | Reed et al. | 455/277.2 |
| 5,731,699 A | | 3/1998 | O'Byrne | 324/77.11 |
| 5,815,813 A | * | 9/1998 | Faruque | 455/446 |
| 5,943,629 A | | 8/1999 | Ballard et al. | 702/2 |
| 5,946,603 A | * | 8/1999 | Ibanez-Meier et al. | 455/13.1 |
| 6,088,351 A | * | 7/2000 | Jenkin et al. | 370/347 |
| 6,169,881 B1 | * | 1/2001 | Astrom et al. | 455/12.1 |

OTHER PUBLICATIONS

Michelson et al., *Symmetry Properties of the Circular Polarization Covariance Matrix*, Journal of Electromagnetic Waves and Applications, vol. 11, pp. 719–738, 1997.

Torrico et al., *Theoretical Investigation of Foliage Effects on Path Loss For Residential Environments*, IEEE 1996, pp. 854–858.

Ordano et al., *Dual Polarized Propagation Channel: Theoretical Model and Experimental Results*, IEEE 1997, pp. 2.363–2.356.

Nghiem et al., *Symmetry Properties in Polarimetric Remote Sensing*, Radio Science, vol. 27, No. 5, pp. 693–711.

* cited by examiner

Primary Examiner—Charles Appiah

(57) ABSTRACT

The composition of an object within a wireless communication channel is determined by analyzing a symmetry characteristic of a polarization pattern of a received signal. The signal is transmitted through the communication channel using a known polarization. A receiver receives the signal and determines a symmetry characteristic of the polarization pattern of the received signal. The symmetry characteristic is matched to a stored symmetry characteristic to determine the composition of the object. Based on the composition of the object, the susceptibility of the wireless communication channel to wind-induced fading can be determined.

20 Claims, 4 Drawing Sheets

METHOD AND SYSTEM FOR ASSESSING THE SUSCEPTIBILITY OF A WIRELESS COMMUNICATION CHANNEL TO WIND-INDUCED FADING

BACKGROUND OF THE INVENTION

The invention relates in general to communication systems and more specifically to assessment of the susceptibility of a wireless communication channel to wind-induced fading.

Many wireless communication systems experience degradation in performance due to fading. Fading may be caused by one or more obstacles that block direct transmission of signals over the communications channel from the transmitter to the receiver. Fading can also occur when a signal is reflected or scattered by obstacles in the environment and two or more versions (or replicas) of the signal arrive at the receiving antenna, each along a slightly different path and each with a slightly different phase. In mobile communication systems, fading may be caused by obstacles such as buildings, trees, vehicles and other objects which alter the communication channel as the mobile unit moves in relation to both the obstacles and a fixed base station.

In fixed wireless systems, the transmitter and the receiver are arranged in locations which are fixed with respect both to each other and to scattering obstacles. Communication channels in a fixed wireless system may experience excess path loss due to the presence of stationary obstacles. The undesired effects of path loss due to stationary objects may be minimized using a variety of techniques. For example, the transmitter power may be adjusted to provide an adequate communication link. Also, the positions of the transmitter and receiver may be adjusted at the time of installation to maximize performance.

Degradation in the performance of a communication system due to changes in the communication path between the receiver and the transmitter resulting from movement of obstacles along the path is more problematic. A communication channel may be particularly susceptible to wind-induced fading if the communication path between the transmitter and the receiver includes foliage. During windy periods, movement of foliage such as on trees or bushes may result in random, time-varying changes in the propagation characteristics of the radio channel between the transmitter and receiver. Such changes often manifest themselves as random, time-varying fading of the received signal. It is therefore advantageous to position the receiver and transmitter in a manner which minimizes the amount of foliage along the path.

By visually inspecting the environment and alternative transmitter and receiver locations, and by using a test transmitter and a narrow-band measurement receiver to select a path that results in minimum path loss, it may be possible to reduce the susceptibility of a communication channel to wind-induced fading. This technique, however, does not provide a reliable method of maximizing the performance of a communication system. For example, it may be difficult to accurately assess the amount of foliage along a particular path because the observer has only limited accessibility to the location. Also, a visual inspection may be deceptive since often the combination of reflected signals cannot be predicted visually.

Another possible solution to the wind-induced fading problem includes observing a communication channel for several days. A communication channel established using a transmitter and receiver can be monitored for variations in performance and the results correlated to weather patterns. However, this potential solution may not be practical due to the required duration of the observation and the need to dedicate equipment to monitor the communication channel for a long period of time.

A partial solution is to determine the location of the scatterers which contribute to the response of the communications channel. This can be accomplished by using a wide-band channel sounder to determine the time-of-arrival of each of the direct and scattered components of the transmitted signal in combination with an apparatus capable of determining the angle-of-arrival of each of the direct and scattered components. However, this potential solution provides little, if any, information concerning the nature of the obstacles and their tendency to move in the presence of wind.

Therefore, there is need for a method, apparatus and system for predicting the performance of a communication channel based on the susceptibility of the channel to wind-induced fading. The method, apparatus and system should be easy to use and should provide an efficient way to optimize the quality of a communication channel in a wireless system by minimizing the susceptibility of the channel to wind-induced fading.

SUMMARY OF THE INVENTION

In an exemplary embodiment of the invention, a transmitter and receiver are used to assess the susceptibility of a fixed wireless communication channel to wind-induced fading by determining the composition of objects within a communication channel between the transmitter and receiver. A polarized signal is transmitted from the transmitter to the receiver through the communication channel. The symmetry characteristics of the polarization response of the channel are analyzed by observing a polarization pattern of the received signal in order to determine the composition of the objects within the communication channel. In this embodiment, the symmetry characteristic of the channel is matched to a stored symmetry characteristic for a known composition. The susceptibility of the communication channel to wind-induced fading is determined based on the amount of foliage within the communication channel.

DETAILED DESCRIPTION OF THE PREFERRED EMBODIMENTS

Figure 1:
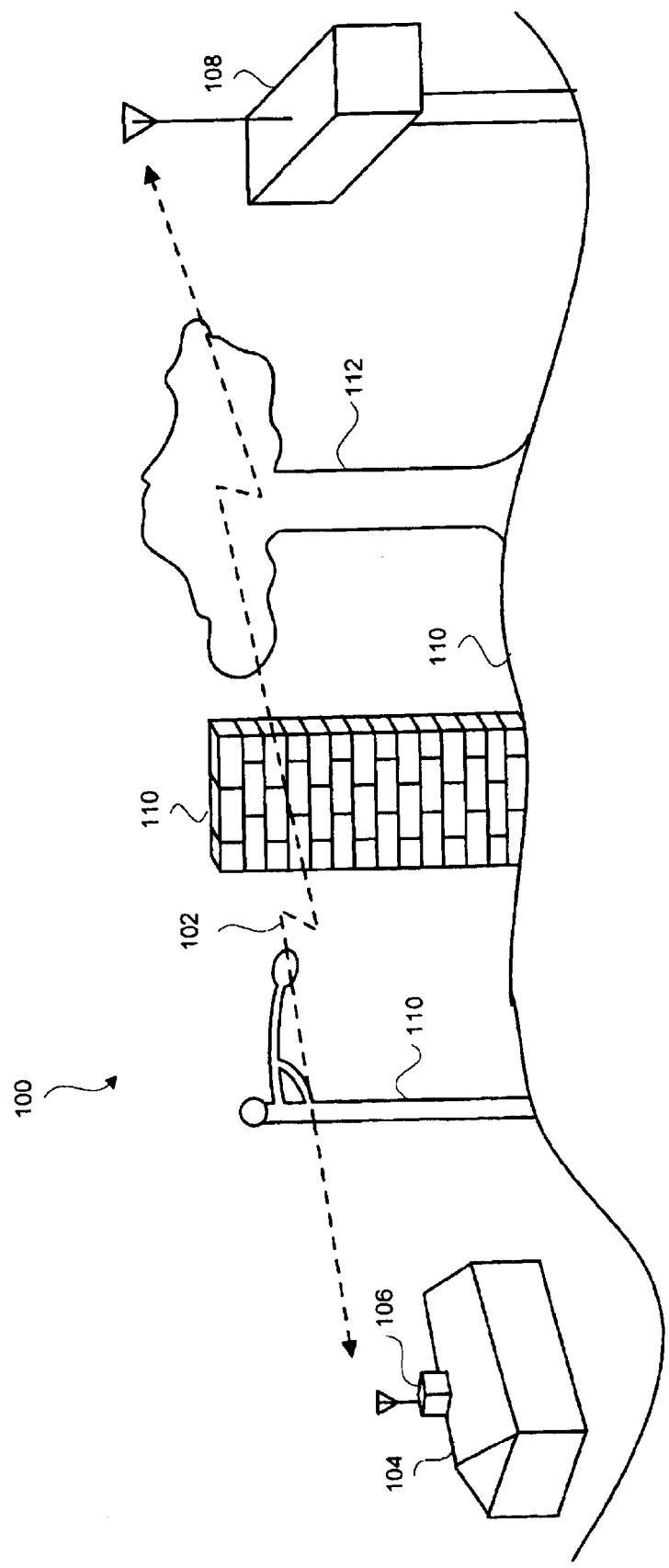
FIG. 1 is a block diagram of a wireless system in accordance with an exemplary embodiment of the invention.

FIG. 1 is a block diagram of a wireless system 100 suitable for determining the susceptibility of a wireless communication channel 102 to wind-induced fading in accordance with an exemplary embodiment of the present invention. In this embodiment, the wireless system 100 is a fixed wireless system providing communications to a subscriber premises 104 through the wireless communication channel 102. A subscriber unit 106 includes a transmitter and a receiver for communicating through the wireless communication channel 102 over a communication path to a base station 108. The communication path (wireless communication channel) 102 may include various radio wave obstacles including stationary objects (rigid scatterers) 110 such as buildings and other man-made structures. Other rigid scatterers 110 include naturally occurring objects such as hills, rocks and other terrain. In addition to rigid scatterers 110, the wireless communication channel 102 includes non-rigid radio wave obstacles 112 such as leaves, branches, and other foliage which tend to move about randomly when blown by wind. Both rigid 110 and non-rigid 112 objects may affect the propagation of radio waves and the performance of the radio communication system 102. Many of the undesired effects of rigid scatterers 110 may be reduced using a variety of techniques. For example, the location of the base unit and subscriber unit can be chosen to maximize performance. The effects of the rigid scatterers 110 on the wireless communication channel 102 should remain consistent over time since the rigid scatterers 110 do not move. As discussed above, however, the propagation characteristics of the wireless communication channel 102 may change due to non-rigid objects 112 within the wireless communication channel 102. In particular, winds can change the position of foliage within the wireless communication channel 102 and thereby change the radio propagation characteristics of the wireless communication channel 102. For example, during calm periods with little or no wind, the wireless communication channel 102 may suffer from few, if any, propagation impairments. During windy periods, the same communication channel may experience substantial fading since branches, leaves and other foliage moving in the wind will cause each of the paths traversed by direct, reflected, scattered, and diffracted radio waves to vary in a random, time-varying fashion.

Figure 2:
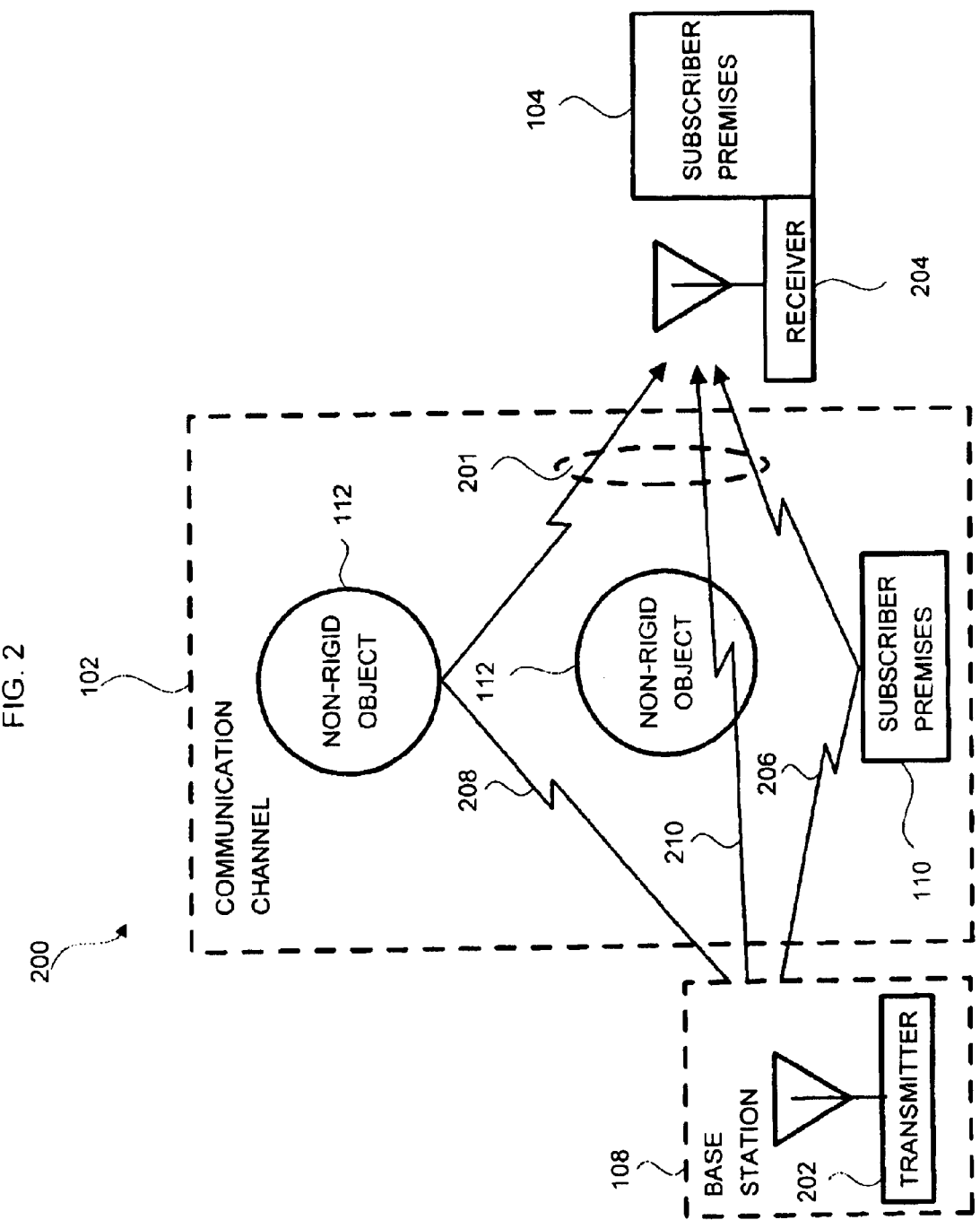
FIG. 2 is a block diagram of a channel analysis system that illustrates signal scattering within the wireless communication channel in accordance with the exemplary embodiment of the invention.

FIG. 2 is a block diagram of the wireless communication channel 102 between a transmitter 202 and a receiver 204 of a channel analysis system 200 in accordance with the exemplary embodiment of the invention. The channel analysis system 200 includes at least a transmitter 202 positioned at the base station 108 and a receiver 204 positioned at the subscriber premises 104. As discussed above, a signal transmitted through the wireless communication channel 102 may be subjected to reflection, diffraction, and other types of scattering. Therefore, the received signal 201 at the receiver 204 will typically comprise several components including a reflected signal 206, a scattered signal 208, and a direct signal 210. A given component of the signal may result from a rigid scatterer 110 or a non-rigid scatterer 112. As illustrated in FIG. 2, components may include a reflected signal 206 resulting from reflection or diffraction by a rigid scatterer 110, a direct and possibly diffracted signal 210 and a signal 208 reflected from a non-rigid scatterer 112. Those skilled in the art will recognize that the received signal 201 may contain fewer or additional components to the components 206–210 illustrated in FIG. 2. Further, any one component may be the result of several scattering objects 110, 112.

The performance of the communication system 100 is maximized by positioning the base station 108 and subscriber unit 106 of FIG. 1 to minimize the effects of non-rigid scatterers 112 on the received signal 201 while maximizing the signal strength of the received signal 201. Therefore, the subscriber unit 106 is positioned at the location determined by the channel analysis system 200 of FIG. 3, resulting in the maximum signal strength and the least effect of non-rigid scatterers 112. Using the analysis method discussed below, several measurements of the wireless communication channel 102 are obtained with the analysis receiver 204 placed at different positions and locations in the vicinity of the subscriber premises 104. The position and location which displays the most desirable propagation characteristics is used as the position of the subscriber unit 106. In order to reduce wind induced fading and maximize the system 100 performance, the communication path with both the least path loss and the least foliage is chosen.

Figure 3:
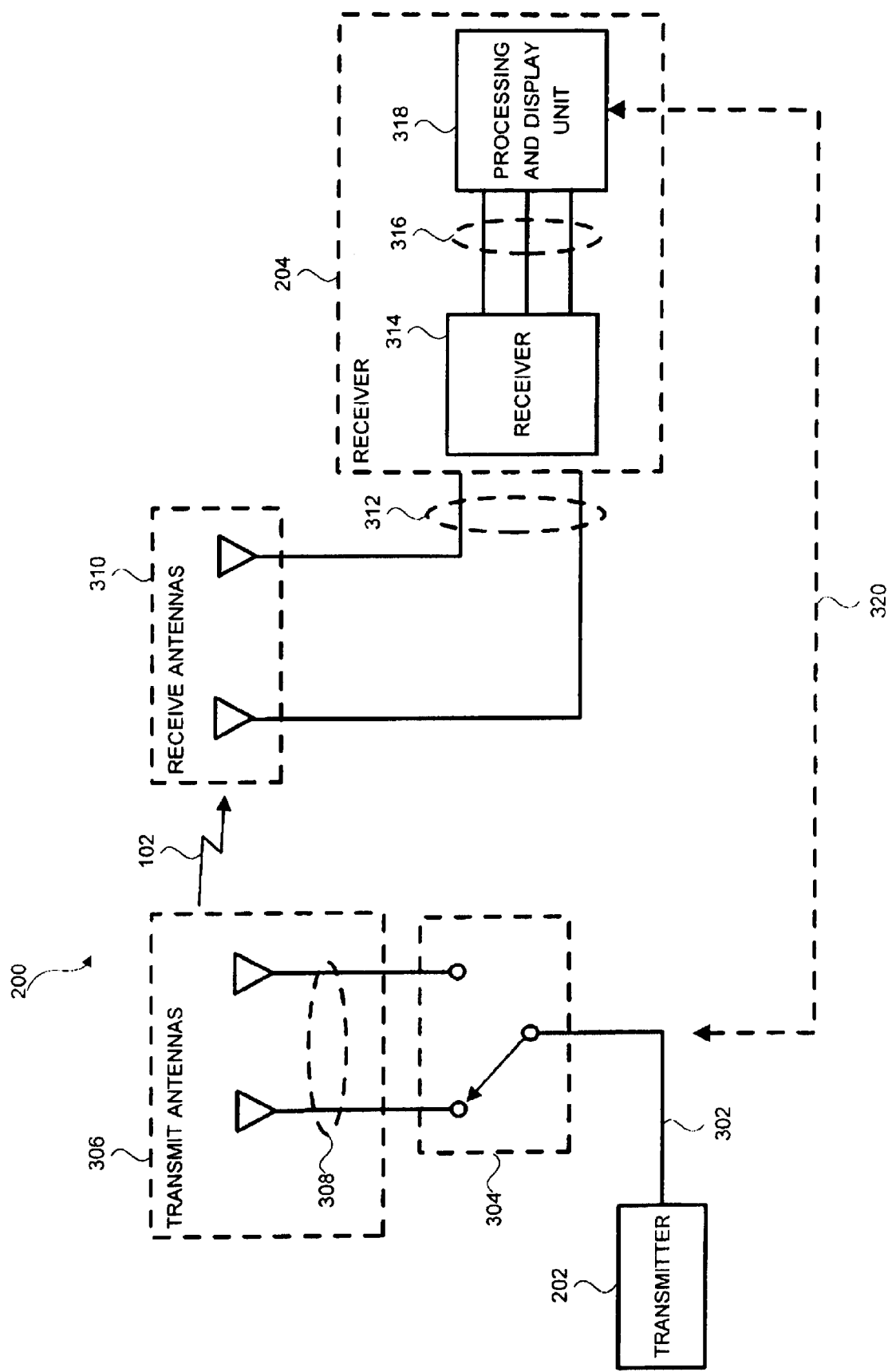
FIG. 3 is a block diagram of a channel analysis system in accordance with the exemplary embodiment of the invention.

FIG. 3 is a block diagram of the channel analysis system 200 in accordance with the exemplary embodiment of the invention. The transmitter 202 generates a test signal which is sent to a selector switch 304 through a suitable transmission cable 302. The polarization selector switch 304 is connected to a pair of orthogonally polarized transmit antennas 306 by suitable transmission cables 308. The position of the polarization selector switch 304 determines which of the two orthogonally polarized transmit antennas 306 will transmit the test signal at a given time. In other words, the polarization of the transmitted test signal can be selected using the polarization selector switch 304. Depending on the setting of the polarization selector switch 304, one of the two orthogonally polarized transmit antennas 306 will radiate the test signal along the communications channel 102 which consists of one or more transmission paths that may contain various scatterers and obstacles. Depending on the symmetry, geometry, location, and other properties of these transmission paths, scatterers, and obstacles, the amplitude, phase, and polarization properties of the test signal will be affected. A pair of orthogonally polarized receive antennas 310 intercept the orthogonally polarized components of the test signal (test signal components) after the test signal components have been modified by the wireless communication channel 102. The test signal components are sent through suitable transmission cables 312 to a dual-channel, coherent measurement receiver 314. The coherent measurement receiver 314 is designed in accordance with known techniques and is capable of measuring both the amplitude and phase of each received component of the received signal with respect to a common reference. Since each received test signal component corresponds to one of the two orthogonally polarized receive antennas 310 and a phase and amplitude for each component is measured, four quantities are obtained for each transmit polarization.

These four quantities (the amplitude and phase of the first test signal component and an amplitude and phase of the second test signal component) are sent via a suitable transmission medium 316 to a processing and display unit 318. The best results will be obtained when measurements of the wireless communication channel 102 for one transmit polarization are suitably combined with measurements of the wireless communication channel 102 for the orthogonal transmit polarization and processed as described below.

In addition to a suitable processor, microprocessor, processor arrangement or controller for facilitating the functions described herein, the processing and display unit 318 contains a suitable memory for storage of software and data including the known polarization characteristics.

In order to accurately identify the transmit polarization of the test signal at the receiver 204, a synchronization mechanism 320 is used for timing purposes. In the exemplary embodiment, a Global Positioning Satellite (GPS) signal is used as a common clock to synchronize the measurements of the channel analysis system 300. The transmitter 202 and receiver 204 follow a predetermined transmission schedule that is referenced to the common clock. Those skilled in the art will recognize the various alternative methods that can be used to synchronize the transmitter 202 and receiver 204. For example, a secondary wireless communication link may be used to transmit a real-time synchronization signal.

In the exemplary embodiment, the channel analysis system 200 ("polarimetric channel sounder") is designed with sufficient angular and temporal resolution to permit the direct signal 210 of FIG. 2 and the plurality of scattered signals 206, 208 to be distinguished from one another. The result permits both the location and the nature of individual scatterers 110–112 to be identified. In general, the resolution requirements increase with the distance from the transmitter 202 to receiver 204 and with the number of scatterers and obstacles (110–112) in the vicinity of the receiver 202.

In order to achieve the best angular resolution, the beam-width of the receive antennas 310 of FIG. 3 should be sufficiently narrow to permit the direct signal 210 and the plurality of scattered signals 206–208 to be distinguished from one another based on their angle-of-arrival. As is known, various electronic and mechanical techniques exist to accomplish this type of resolution including the use of directive antennas, and phased array antennas.

Depending on the temporal resolution required to distinguish between individual transmission paths, the transmitter 202 and receiver 204 may have a variety of implementations. In the exemplary embodiment, the transmitter 202 generates a set of radio frequency signals, either sequentially or in combination, while the receiver 204 is designed to process the signals, either sequentially or in combination, as appropriate, in order to extract the required polarimetric information. In order to achieve the best temporal resolution, the transmitter-receiver pair (202, 204) should take the form of a coherent wide-band channel sounder which is capable of distinguishing the direct signal 210 and the plurality of scattered signals 206, 208 based on their time-of-arrival.

In an alternate embodiment, suitable for use when angular resolution alone is sufficient to distinguish transmission paths, the transmitter 202 generates a test signal which consists of a single radio frequency which is switched between the two orthogonal transmit polarizations as described above. Those skilled in the art will recognize the various alternate transmitter-receiver implementations that may be used depending on the desired results and requirements.

Although the channel analysis system 300 is implemented as a separate analysis device having a transmitter 202 and receiver 204, the necessary hardware and software needed to perform the functions described herein may be implemented as part of the communication system 100 in alternate embodiments.

Figure 4:
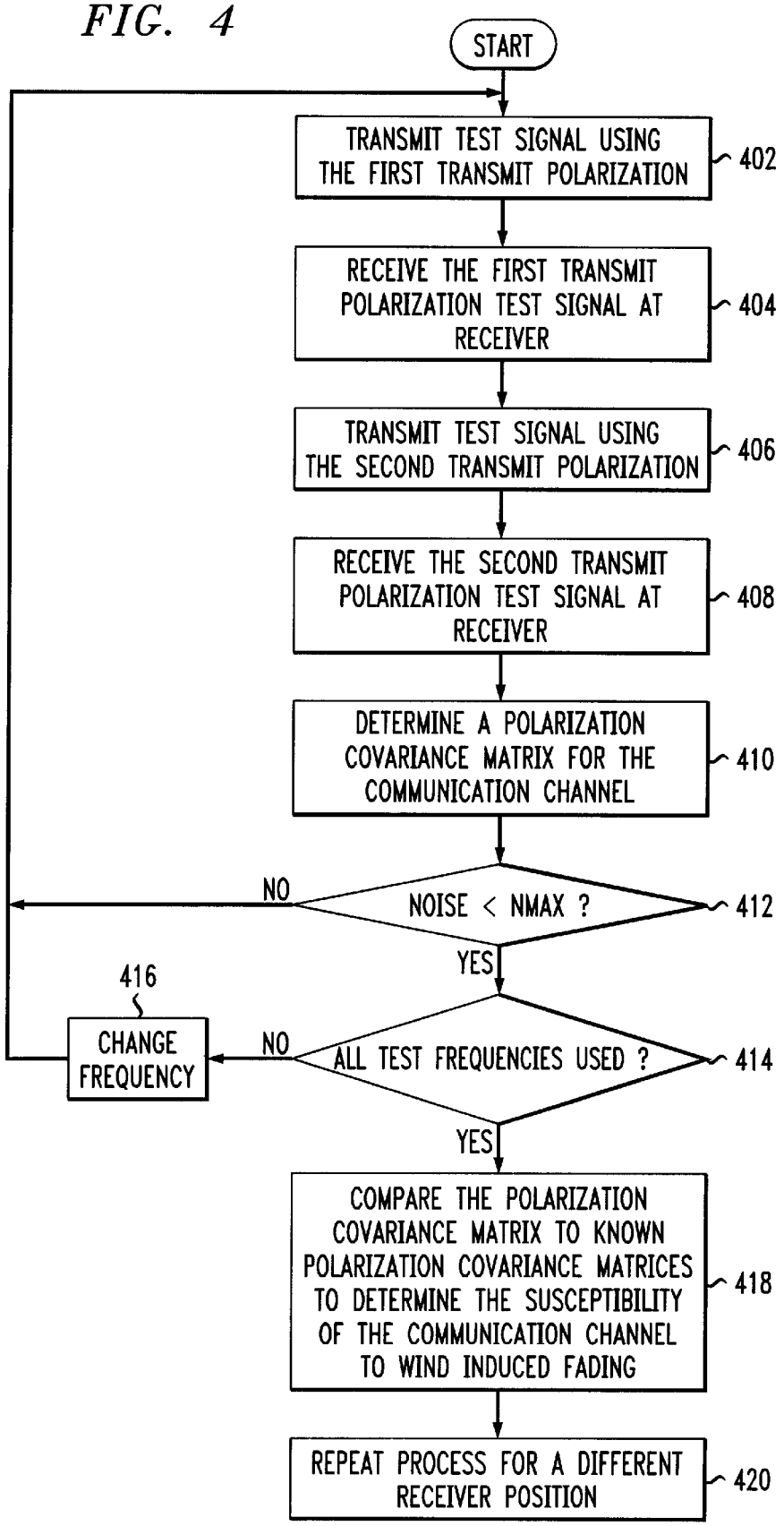
FIG. 4 is a flow chart of a method analyzing a wireless communication channel in accordance with the exemplary embodiment of the invention.

FIG. 4 is flow chart of a method of characterizing the wireless communication channel 102 in accordance with the exemplary embodiment of the invention. After the transmitter 202 and receiver 204 are positioned in the first location to be evaluated, the test signal is transmitted through the wireless communication channel 102 first using one transmit polarization, then, after a suitable synchronization signal has been received or exchanged, using the orthogonal transmit polarization. The test signals are received at the receiver 204. The polarization symmetry pattern displayed by the received signals are compared to known polarization symmetries of common scatterers in order to determine the degree to which scattering is due to non-rigid scatterers such as foliage 112. If measurement indicates that particular orientation and position of the receiver 204 results in a wireless communication channel 102 having a relatively large amount of foliage, it is determined that the wireless communication channel 102 will likely have a relatively high susceptibility to wind-induced fading. Various measurements are obtained at different locations in order to determine the best position for the subscriber unit 106.

At step 402, the test signal is transmitted using the first transmit polarization. The test signal is transmitted through one of the orthogonally polarized antennas 306 by selecting a first position of the polarization selector switch 304.

At step 404, the first transmit polarization test signal is received at the receiver 204 as a received signal that may comprise any combination of scattered signals 206, 208 and the direct signal 210. The amplitude and phase of the signals received by each of the orthogonally polarized receive antennas 310 are determined by the dual-channel, coherent measurement receiver 314 and passed to the processing and display unit 318. In the exemplary embodiment, several measurements are obtained over a short period of time and averaged to produce an amplitude value and a phase value. In alternate embodiments, however, a single measurement may be taken to produce the amplitude-phase pair.

At step 406, the test signal is transmitted using the second transmit polarization by setting the antenna switch to a second position. The test signal is, therefore, transmitted through the other of the two orthogonally polarized transmit antennas 306.

At step 408, the amplitude and phase of the signals received by each of the orthogonally polarized receive antennas 310 are determined by the dual-channel, coherent measurement receiver 314 and passed to the processing and display unit 318.

At step 410, a polarization covariance matrix is determined for the wireless communication channel 102. The polarization covariance matrix corresponds to a polarization pattern and, particularly, to a polarization symmetry characteristic for the particular wireless communication channel 102. When referenced to the properties of the transmitted signals, the amplitude and phase data corresponding to the received signal for the first transmit polarization test signals and the second transmit polarization test signals define the polarization transmission matrix of the channel, $$[T] = \begin{bmatrix} T_{11} & T_{12} \\ T_{21} & T_{22} \end{bmatrix} \tag{1}$$

This 2×2 complex matrix describes the depolarizing properties of the transmission path. The subscripts refer to the orthogonal polartization states of the transmit 306 and receive 310 antennas. The polarization transmission matrix is reformed into a 4×1 polarization transmission vector, $$T = \begin{bmatrix} T_{11} \\ T_{12} \\ T_{21} \\ T_{22} \end{bmatrix} \tag{2}$$

and multiplied by its complex conjugate. This removes information concerning absolute phase which is unecessary in the remaining steps. The result is the polarization covariance matrix, $$\begin{bmatrix} T_{11}T_{11}^* & T_{11}T_{12}^* & T_{11}T_{21}^* & T_{11}T_{22}^* \\ T_{12}T_{11}^* & T_{12}T_{12}^* & T_{12}T_{21}^* & T_{12}T_{22}^* \\ T_{21}T_{11}^* & T_{21}T_{12}^* & T_{21}T_{21}^* & T_{21}T_{22}^* \\ T_{22}T_{11}^* & T_{22}T_{12}^* & T_{22}T_{21}^* & T_{22}T_{22}^* \end{bmatrix} \quad (3)$$

a 4×4 Hermitian matrix with real diagonal elements.

At step 412, it is determined whether the residual noise component in the measurements is below a predetermined threshold, $N_{max}$. By their nature, individual measurements may contain significant noise. Accordingly, the set of polarization covariance matrices which result from processing these measured data are linearly averaged, element by element, to filter the noise and yield the final result. A sufficient number of measurements has been collected and averaged when the noise component falls below the predetermined threshold.

At step 414, it is determined whether all the test frequencies have been transmitted. If not, the test frequency is changed at step 416 and the method returns to step 402. Otherwise, the method continues at step 418.

At step 418, the polarization covariance matrix is compared to other polarization covariance matrices in order to determine the susceptibility of the wireless communication channel 102 to wind-induced fading. The symmetry properties of the obstacles and scatterers (110, 112) along the transmission path (102) often give rise to polarization covariance matrices of known form. For example, trees and bushes usually display a characteristic referred to in the art as azimuthal symmetry while buildings and man-made structures often display a characteristic called reflection symmetry. The form of the polarization covariance matrix observed over a given transmission path is compared to matrices which have been measured or predicted for paths with known characteristics. The stored polarization matrices correspond to known polarization symmetry characteristics. The matrices measured at the site are compared to known polarization covariance matrices. One technique which can be used to determine which known matrix most closely resembles the unknown matrix is supervised classification. In the exemplary embodiment, the comparison is made using all elements of the polarization covariance matrix. In alternate embdoments, the subset may be used which is sufficient to provide the desired degree of discrimination. Although the comparison may be performed at a location other than the subscriber premises, the comparison is conducted by the processing and display unit 318 in the exemplary embodiment. A memory storage within the receiver 204, preferably, contains the stored polarization symmetry characteristics.

At step 420, the process is repeated for a different receiver 204 position. The procedure is repeated until a predetermined number of positions are tested or wireless communication channel 102 is identified as having acceptable characteristics for the communication system 100.

Therefore, an optimum wireless communication channel 102 can be chosen by comparing the polarization characteristics for various channels to identify a channel having the least susceptibility to wind-induced fading. Polarization characteristics of the several channels are compared to known polarization characteristics to determine which channels contain non-rigid scatterers 112 such as foliage.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A method comprising the steps of:

receiving a signal transmitted through a wireless communication channel; and determining a composition of an object in the wireless communication channel based on a received symmetry characteristic of a polarization pattern of the signal.

2. A method in accordance with claim 1 further comprising the step of determining a susceptibility of the wireless channel to wind-induced fading based on the composition of the object.

3. A method in accordance with claim 2, wherein the step of determining the composition comprises the steps of:

matching the received symmetry characteristic to a stored polarization symmetry characteristic; and determining the composition of the object to be a composition corresponding to the stored polarization symmetry characteristic.

4. A method in accordance with claim 3 wherein the step of determining a susceptibility of the wireless communication channel to wind-induced fading comprises the steps of:

determining a degree of potential movement of the object based on the composition of the object; and determining the susceptibility of the wireless channel to the wind-induced fading based on the degree of potential movement of the object.

5. A method in accordance with claim 4, wherein the step of determining the degree of potential movement comprises the steps of:

characterizing the composition of the object as foliage to produce a foliage characterization; and determining the degree of potential movement based on the foliage characterization.

6. A method in accordance with claim 3 wherein the step of determining a susceptibility of the wireless channel to wind-induced fading comprises the steps of:

characterizing the composition of the object as foliage; and determining the susceptibility to the wind-induced fading based on the composition of the object.

7. A method in accordance with claim 3 further comprising the steps of:

transmitting the signal with a first polarization within a first predetermined time period;

transmitting the signal with a second polarization within a second predetermined time period; and determining the polarization pattern based on an observation of the signal during the first time period and during the second time period.

8. A method in accordance with claim 7, wherein the step of determining the polarization pattern comprises the steps of:

receiving the signal through two orthogonally polarized receive antennas during the first time period and the second time period; and determining a polarization covariance matrix based on the received signal, wherein the step of determining the susceptibility to the wind-induced fading is based on the polarization covariance matrix.

9. A method in accordance with claim 8, further comprising the steps of:
    measuring a first received signal, corresponding to the signal transmitted during the first time period, received through one of the two orthogonally polarized receive antennas to produce a first phase and amplitude for the first received signal;
    measuring the second received signal, corresponding to the signal transmitted during the second time period, received through another of the two orthogonally polarized receive antennas to produce a second phase and amplitude for the second received signal;
    measuring a third received signal, corresponding to the signal transmitted during the first time period, received through another of the two orthogonally polarized receive antennas to produce a third phase and amplitude for the third received signal;
    measuring a fourth received signal, corresponding to the signal transmitted during the second time period, received through the another of the two orthogonally polarized receive antennas to produce a fourth phase and amplitude for the first received signal, the first, second, third and fourth phase and amplitude forming a polarization transmission matrix describing the polarization characteristic of the communication channel; and
    converting the polarization transmission matrix to a polarization covariance matrix, wherein the polarization covariance matrix is a four by four matrix comprising a plurality of real and complex values associated with the polarization characteristic.

10. A receiver comprising:
    a radio frequency circuit adapted to receive a signal transmitted through a wireless communication channel; and
    a processor adapted to determine a composition of an object in the wireless communication channel based on a received symmetry characteristic of a polarization pattern of the signal.

11. A receiver in accordance with claim 10, wherein the processor is further adapted to determine a susceptibility of the wireless communication channel to wind-induced fading based on the composition of the object.

12. A receiver in accordance with claim 10 further comprising:
    a memory storage containing a stored polarization symmetry characteristic, wherein the processor is further adapted to match the received symmetry characteristic to the stored polarization symmetry characteristic to determine the composition of the object.

13. A receiver in accordance with claim 12 further comprising:
    an antenna coupled to the radio frequency circuit, the antenna adapted to receive the signal in a plurality of polarization orientations.

14. A receiver in accordance with claim 13, wherein the memory storage comprises a plurality of stored polarization symmetry characteristics, each of the plurality of stored polarization symmetry characteristics corresponding to a predefined object composition.

15. A receiver in accordance with claim 14 wherein the processor is further adapted to match the received symmetry characteristic to at least one of the plurality of stored polarization symmetry characteristics to identify the composition of the object.

16. A receiver in accordance with claim 15 further comprising:
    a pair of orthogonally polarized antennas adapted to receive the a plurality of components of the signal.

17. A channel analysis system comprising:
    a transmitter having a pair of orthogonally polarized transmit antennas and adapted to transmit a first signal having a first polarization and a second signal having a second polarization through a communication channel; and
    a receiver coupled to the transmitter through the communication channel, the receiver comprising:
        a pair of orthogonally polarized antennas for receiving the signals;
        a coherent measurement receiver coupled to the pair of orthogonally polarized antennas to receive the signals; and
    a processor adapted to determine the susceptibility of the communication channel to wind-induced fading based on a polarization characteristic of the communication channel.

18. A system in accordance with claim 17, further comprising:
    a memory adapted for storing a known polarization characteristic for a non-rigid scatterer, the processor adapted to compare the polarization characteristic of the communication channel to the known polarization characteristic.

19. A system in accordance with claim 18, the processor further adapted to determine a polarization covariance matrix in accordance with the signal, the polarization covariance matrix indicating the susceptibility of the communication channel to wind-induced fading.

20. A system in accordance with claim 19, wherein the system is implemented as part of a communication system.

* * * * *